(12) United States Patent
Chen

(10) Patent No.: US 7,339,286 B1
(45) Date of Patent: Mar. 4, 2008

(54) PORTABLE WIND POWER GENERATOR

(76) Inventor: Shih H Chen, No.1-57, Zhonghua Rd., Yongkang City, Tainan County 710 (TW)

( * ) Notice: Subject to any disclaimer, the term of this patent is extended or adjusted under 35 U.S.C. 154(b) by 0 days.

(21) Appl. No.: 11/559,682

(22) Filed: Nov. 14, 2006

(51) Int. Cl.
*F03D 9/00* (2006.01)
(52) U.S. Cl. ...................................................... 290/55
(58) Field of Classification Search ................ 290/55
See application file for complete search history.

(56) References Cited

U.S. PATENT DOCUMENTS

| | | | | |
|---|---|---|---|---|
| 6,624,530 | B1 * | 9/2003 | Toulon ........................ | 290/55 |
| 6,897,575 | B1 * | 5/2005 | Yu .............................. | 290/44 |
| 7,105,940 | B2 * | 9/2006 | Weesner et al. ............. | 290/44 |
| 2006/0213697 | A1 * | 9/2006 | Sutherland .................. | 180/2.2 |
| 2007/0153537 | A1 * | 7/2007 | Scott et al. .................. | 362/503 |

FOREIGN PATENT DOCUMENTS

| | | | |
|---|---|---|---|
| DE | 3405091 A1 * | 8/1985 | |
| GB | 2329534 A * | 3/1999 | |
| JP | 2001078410 A * | 3/2001 | |
| JP | 2001115945 A * | 4/2001 | |
| RU | 2009372 C1 * | 3/1994 | |
| RU | 2062707 C1 * | 6/1996 | |
| SU | 1747745 A1 * | 7/1992 | |

\* cited by examiner

*Primary Examiner*—Joseph Waks

(57) ABSTRACT

A portable wind power generator capable of being stored in a folded manner includes a storage case and a power-generating system. The power-generating system is disposed in the storage case. The storage case includes a case body and a plurality of covers. The case body and the plurality of covers form a hollow accommodating space. Further, the power-generating system includes a power-generating unit, an electricity unit, a vane assembly and a storage unit. The vane assembly is disposed in the accommodating space in a folded manner. The power-generating unit is connected with the vane assembly. The electricity unit and the storage unit are mounted on the case body, respectively. Each component of the power-generating unit is electrically connected to one another. With the wind force generated by the vane assembly, the power-generating unit can be driven to generate the electricity, thereby to supply the electricity to the user and facilitate the carrying of the wind power generator.

11 Claims, 7 Drawing Sheets

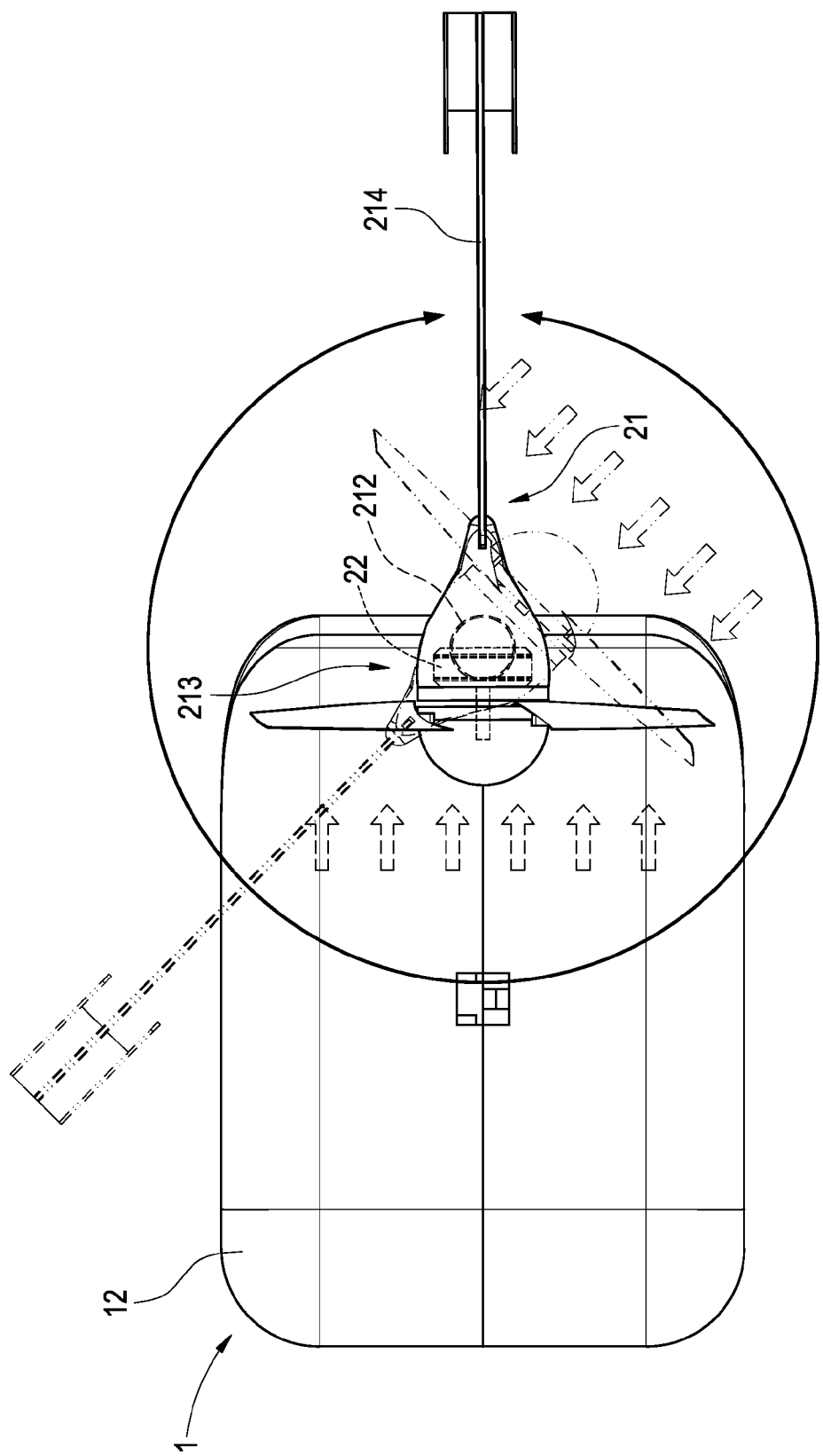

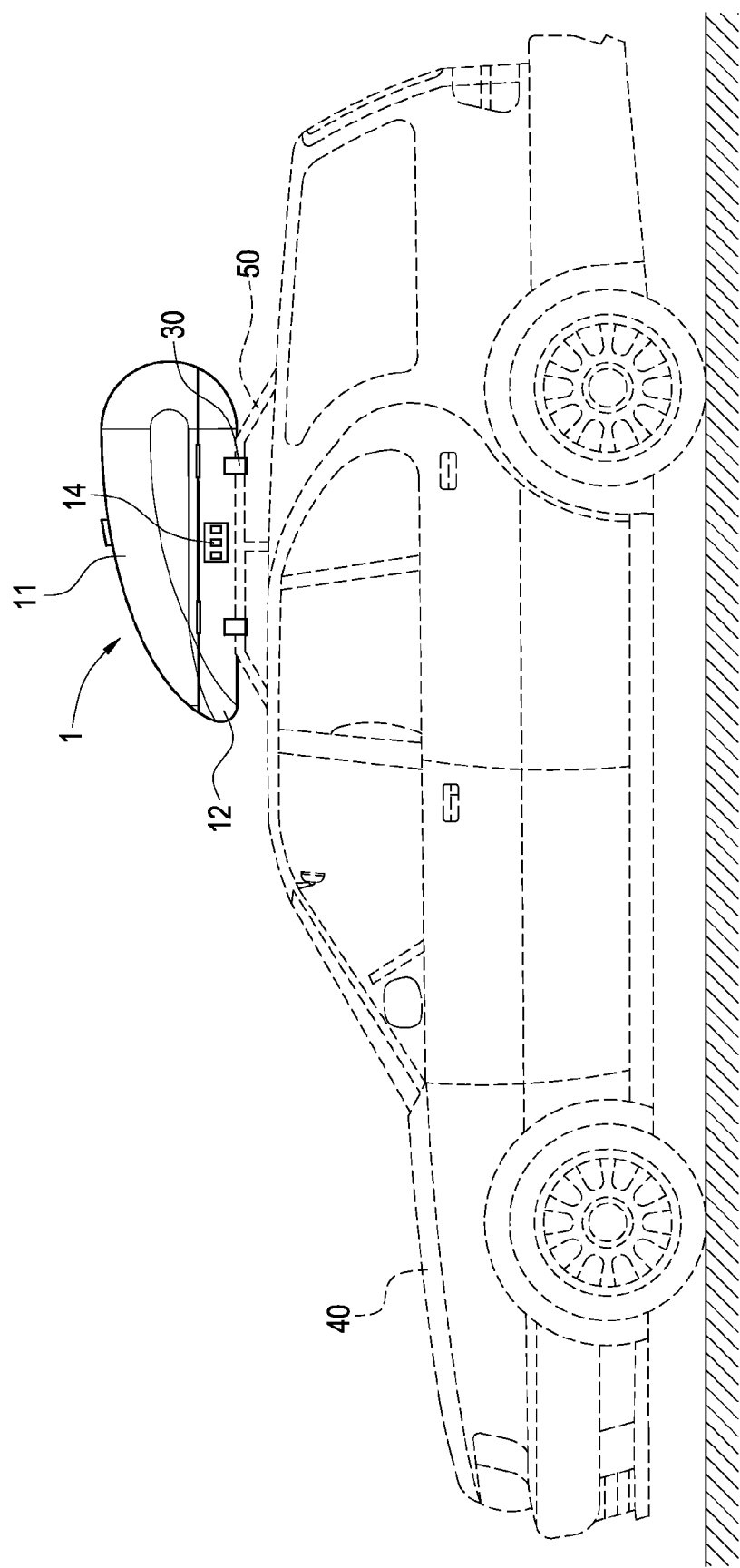

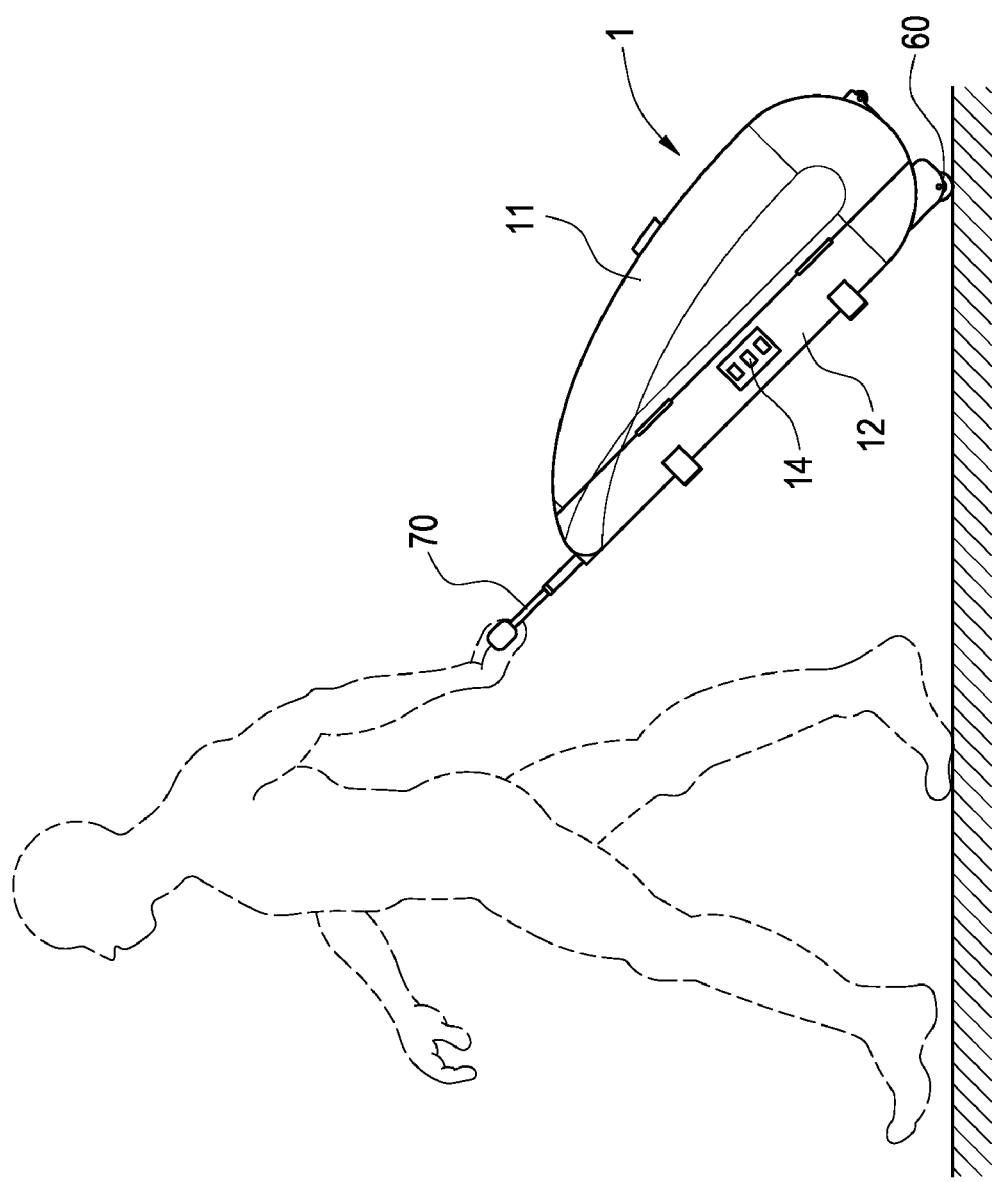

PORTABLE WIND POWER GENERATOR

BACKGROUND OF THE INVENTION

1. Field of the Invention

The present invention relates to a generator, and in particular to a wind power generator capable of generating electricity by utilizing the wind power.

2. Description of Prior Art

With the change in global climate and the voice of environmental protection, more and more countries recognize that the energy sources in the earth are reducing and thus gradually take renewable energies into consideration for serving as primary energies in the future since they are clean, emit low greenhouse gases and belong to indigenous energy. In view of this, our government's energy policy is to gradually develop renewable energy.

Wind power generation has already been one of the options of renewable energies to be developed. The wind power is clean without generating any pollution. Further, in comparison with the traditional thermal power generation or nuclear power generation, since the source of the wind power generation is inexhaustible natural wind, it can generate power without utilizing the conversion of substances. At earlier stage, the cost of the wind power generation is too large and the thus-generated amount of electricity is insufficient. However, with the continuous progress in the technique of power generation and the set of generators made of newly developed materials, the current set of wind power generators can achieve a high efficiency. Moreover, the space occupied by the set of wind power generators is so limited that it is a cost-effective way of power generation.

Although the technique of wind power generation has already well developed to be used as a renewable energy, it is still difficult to become popular in daily life in view of the current level of the art. Since most sets of wind power generators are fixedly provided at proper sites to perform the power generation, the set of wind power generators is designed to be immobile and thus cannot be manually carried like the structure of traditional generators. Therefore, even though the wind power generation has advantage of high efficiency and no pollution, the mobility of the traditional generators still cannot be substituted.

Although the set of traditional generators has the advantage of mobility, the structure thereof is bulky and occupies a huge space. Therefore, it is necessary to utilize manpower to transport the traditional generators and thus this is still a troublesome drawback. According to the above, in order to utilize the renewable energy and give consideration to the high mobility of traditional generators, it is an important issue for those skilled in this art to overcome the above problems.

SUMMARY OF THE INVENTION

In view of the above differentia, the present invention is to provide a portable wind power generator capable of facilitating the storage and carrying thereof. By locating a wind power generator in a case body and making the wind power generator to be foldable, it is convenient for the user to store or unfold such a wind power generator. In addition to occupy a smaller space, the integral structure of the wind power generator and the case body can enhance the mobility thereof.

The present invention provides a portable wind power generator comprising a storage case and a power-generating system. The power-generating system is disposed in the storage case. The storage case includes a hollow case body and a plurality of covers. The case body and the plurality of covers form a hollow accommodating space. Further, the power-generating system comprises a power-generating unit, an electricity unit, a vane assembly and a storage unit. The vane assembly is disposed in the accommodating space. The power-generating unit is provided in the back of the vane assembly and connected with the vane assembly. The electricity unit and the storage unit are mounted on the case body, respectively. Each component of the power-generating unit is electrically connected to one another. With the wind force generated by the vane assembly, the power-generating unit can be driven to generate the electricity, thereby to supply a convenient renewable energy to the user.

BRIEF DESCRIPTION OF THE DRAWINGS

FIG. 5 is a top view showing the operation of the present invention;

FIG. 6 is another schematic view showing the operation of the present invention; and FIG. 7 is another schematic view showing the operation of the present invention.

DETAILED DESCRIPTION OF THE INVENTION

The technical contents and the detailed description of the present invention will be made with reference to the accompanying drawings.

Figure 1:
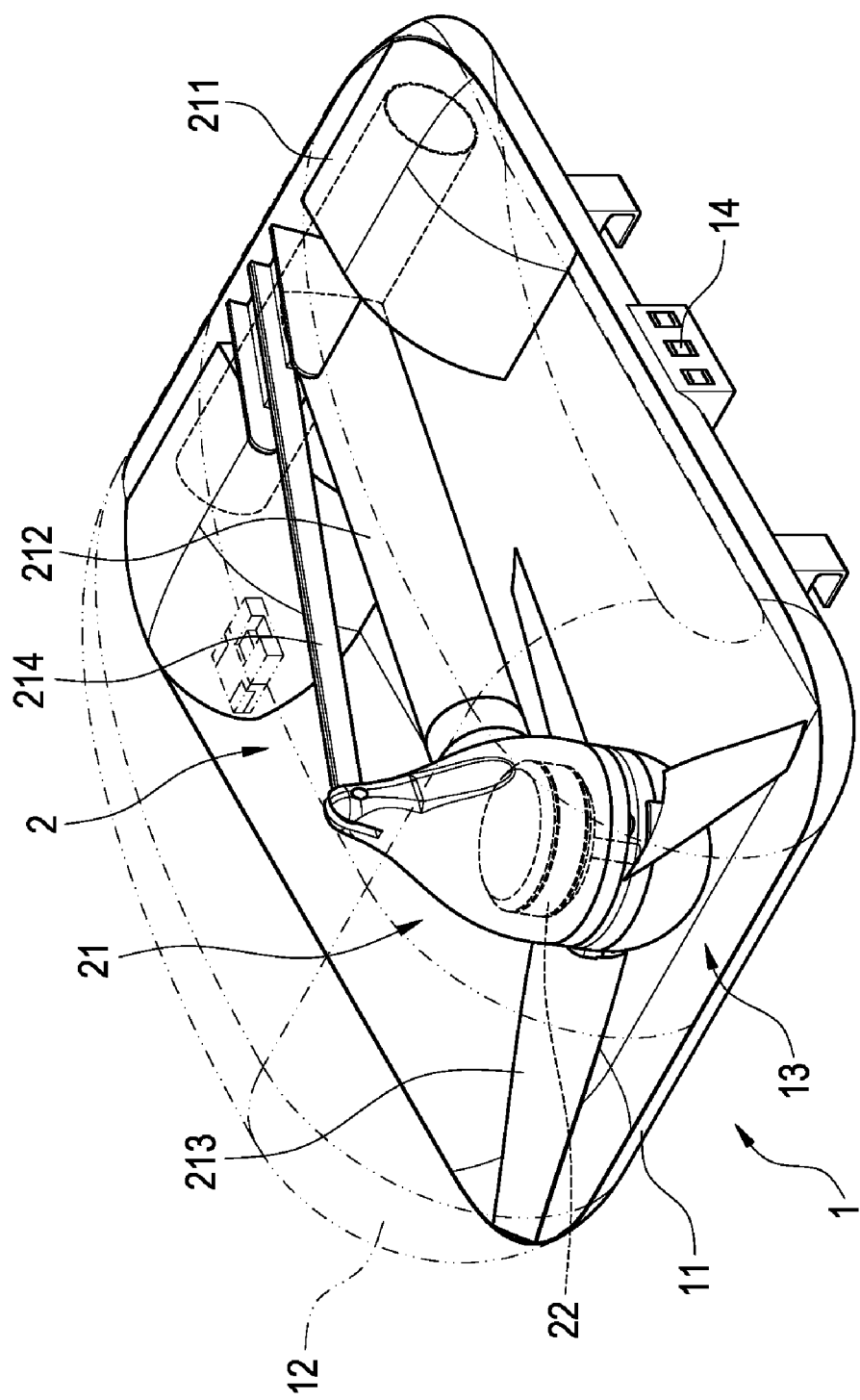
FIG. 1 is a perspective view (I) showing the structure of the present invention.
Figure 2:
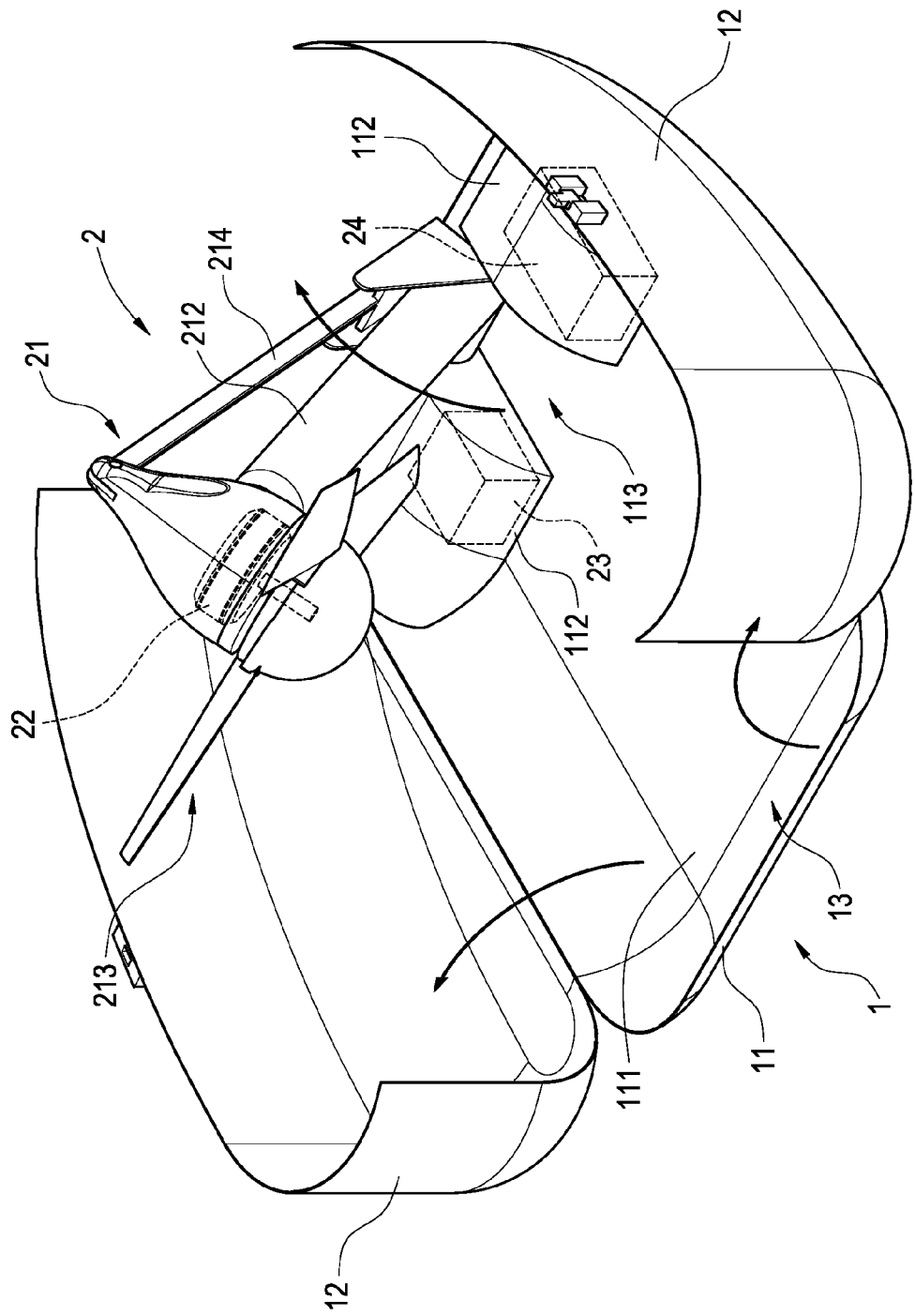
FIG. 2 is a perspective view (II) showing the structure of the present invention.
Figure 3:
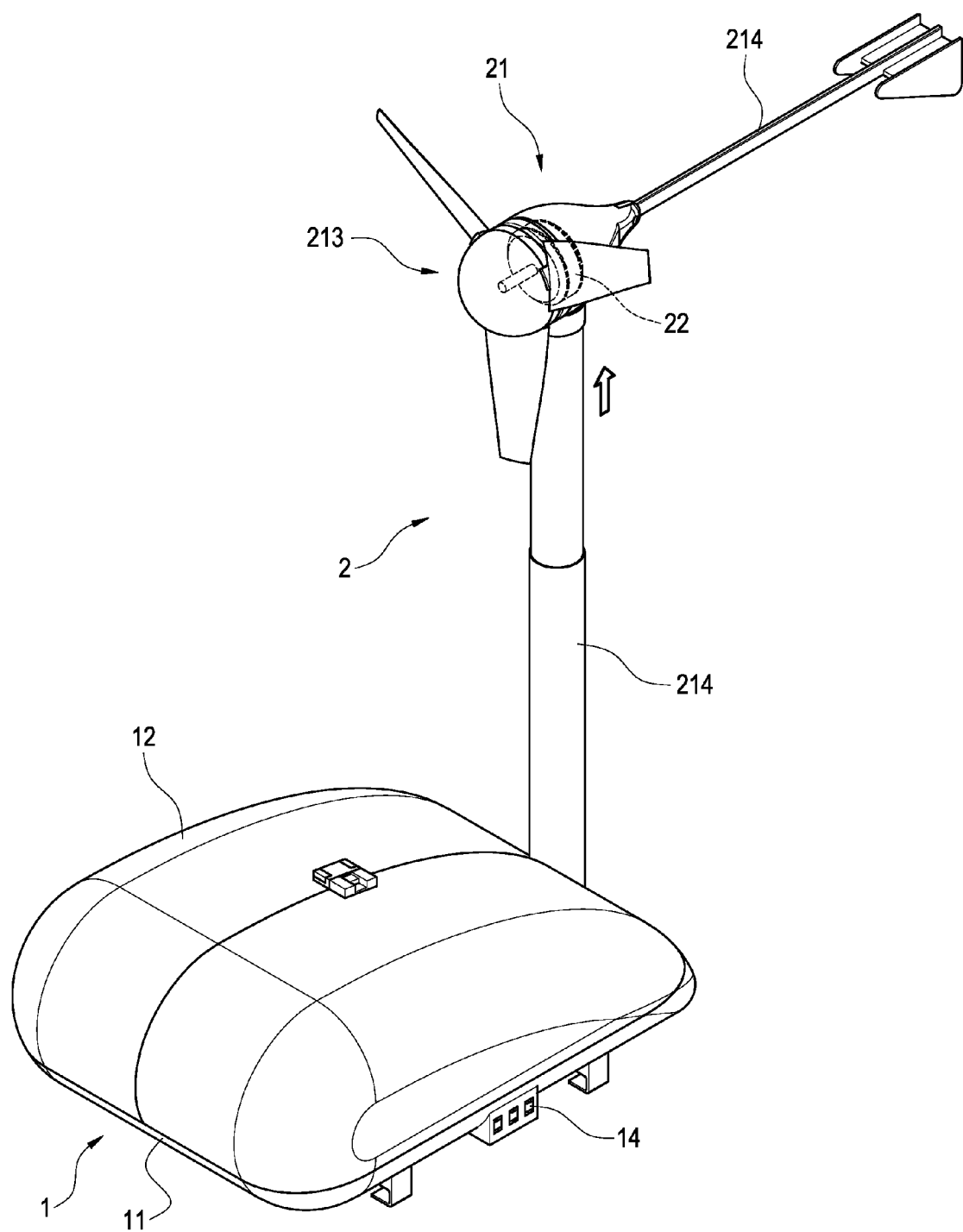
FIG. 3 is a perspective view (III) showing the structure of the present invention.

With reference to FIGS. 1 to 3, each of them is a perspective view showing the structure of the wind power generator of the present invention. As shown in the figures, the wind power generator of the present invention comprises a storage case 1 and a power-generating system 2. The power-generating system 2 is disposed in the storage case 1. The storage case 1 comprises a case body 11 and at least one cover 12. In the present embodiment, a plurality of covers 12 is provided. The interior of the case body 11 is hollow. The plurality of covers 12 is each shaped into a semi-arc piece symmetrical with respect to left and right and connected to the left and right sides of the case body 11. After the plurality of covers 12 is connected to each other, they enclose at the case body 11 to form a hollow accommodating space 13. Further, the case body 11 has a platen 111. One end of the platen 111 has at least one protruding accommodating shell 112. In the present embodiment, the plurality of accommodating shells 112 is provided and a gap 113 is formed between those accommodating shells 112. The power-generating system 2 further includes a blade assembly 21, a power-generating unit 22, an electricity unit 23 and a storage unit 24. The vane assembly 21 is received in the accommodating space 13 of the storage case 1. The vane assembly 21 has a pivot 211 and a supporting pillar 212. The pivot 211 is provided on the platen 111 and connected with the supporting pillar 212 to form a T-shape structure, thereby to allow the supporting pillar 212 to rotate in a vertical direction. The supporting pillar 212 can be extended or retracted. One end of the supporting pillar 212 is connected to a blade set 213.

The blade set 213 has a plurality of blades and a rotating means, which is conventional and thus the description thereof is omitted. The distal end of the blade set 213 is connected to a foldable rudder 214. Therefore, when the supporting pillar 212 is bent downwardly, a portion of the supporting pillar 212 is exactly accommodated into the gap 113, so that the blade set 213 can be accommodated into the accommodating space 13. Further, the power-generating unit 22 is disposed in the back of the blade set 213 and connected to the blade set 213, thereby to convert the mechanical energy of the blade set 213 into electricity. Further, the electricity unit 23 is disposed in the accommodating shell 112 and electrically connected with the power-generating unit 22, thereby to perform the current conversion of the electricity generated by the power-generating unit 22. For example, a DC power can be converted into an AC current. Finally, the storage unit 24 is provided in another accommodating shell 112 and electrically connected with the electricity unit 23, thereby to store the electricity conducted from the electricity unit 23. One side of the case body 11 is provided with a plurality of connectors 14 electrically connected with the storage unit 24, thereby to supple the stored electricity to external electronic components or appliances.

Figure 4:
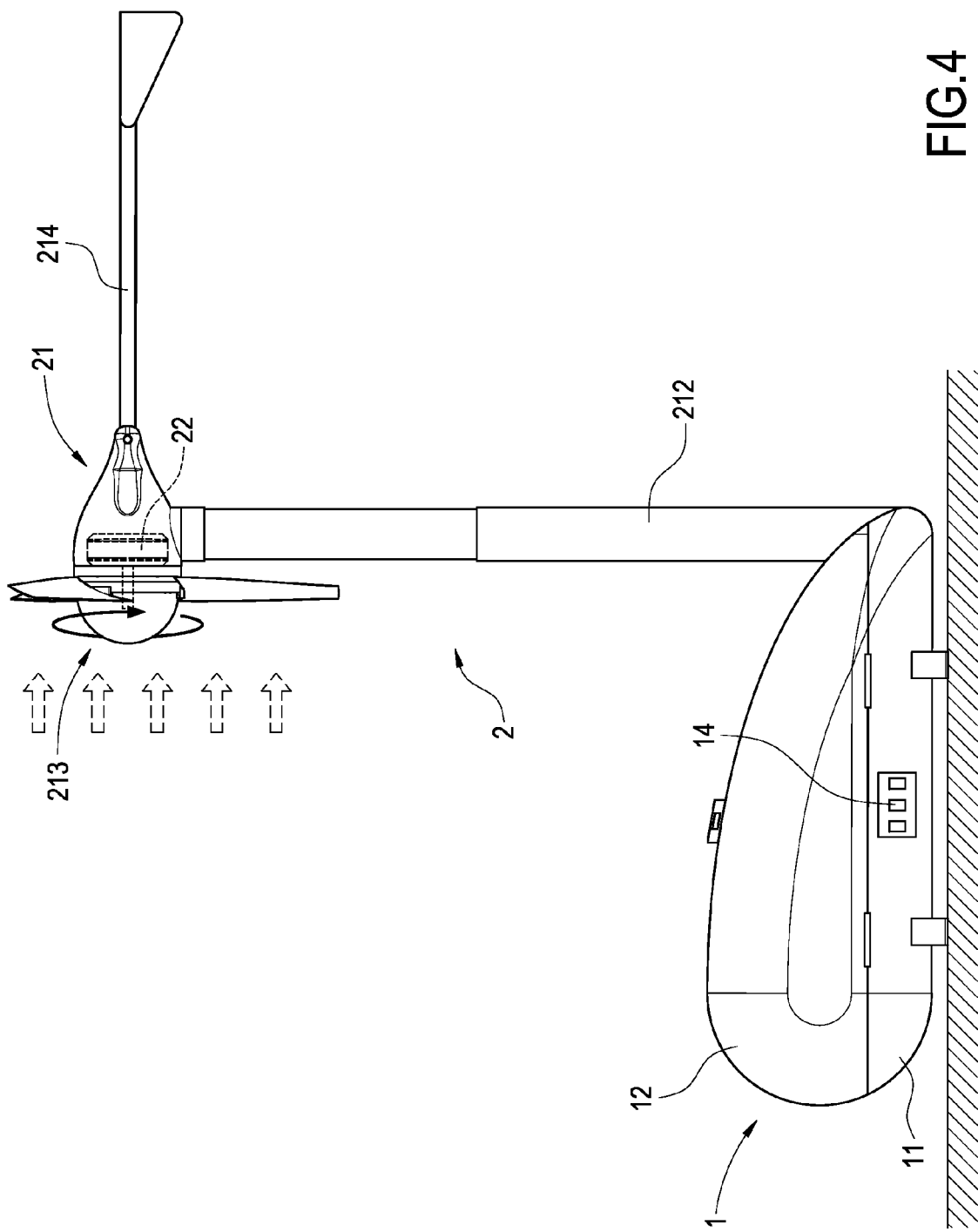
FIG. 4 is a side view showing the operation of the present invention.

With reference to FIGS. 4 and 5, they are a side view and a top view showing the operation of the present invention, respectively. As shown in the figures, the vane assembly 21 of the wind power generator of the present invention rises outwardly from the interior of the storage case 1 via the pivot 211. At the same time, with the extending and retracting action of the supporting pillar 212, the blade set 213 can be adjusted to a surface facing the wind and having a suitable height. With natural wind flow (as indicated by the arrow), the blade set 213 can be driven to rotate to generate mechanical energy. Then, the power-generating unit 22 connected thereto converts the mechanical energy generated by the blade set 213 into electricity. Further, the thus-generated current is subjected to a current conversion by the electricity unit 23 and then stored in the storage unit 24, thereby to supply the electricity to electronic products or appliances. Further, as shown in FIG. 5, the rudder 214 provided in the back of the blade set 213 can be changed according to the direction of wind flow, so that the blade set 213 can rotate in 360 degrees, thereby to operate in different directions of wind flow.

Further, the wind power generator of the present invention can be carried with different orientations. As shown in FIG. 6, the bottom of the storage case 1 is provided with a plurality of fixing frames 30, so that it can be fixed on a carrier 50 provided on the top of a vehicle body 40.

Alternatively, as shown in FIG. 7, one end of the bottom of the storage case 1 is provided with a wheel assembly 60. Further, the other end of the bottom of the storage case 1 is provided with a telescopic pull rod 70, thereby to facilitate the user to drag the wind power generator.

Although the present invention has been described with reference to the foregoing preferred embodiments, it will be understood that the invention is not limited to the details thereof. Various equivalent variations and modifications can still be occurred to those skilled in this art in view of the teachings of the present invention. Thus, all such variations and equivalent modifications are also embraced within the scope of the invention as defined in the appended claims.

What is claimed is:

1. A portable wind power generator, comprising:
   a portable storage case including a case body and a cover formed by two symmetrical semi-arc pieces being rotatably connected to left and right sides of the case body, respectively, the case body and the cover forming an accommodating space; and
   a foldable power-generating system provided in the storage case, the power-generating system including a blade assembly received in the accommodating space in a folded manner
   wherein the blade assembly includes a blade set, a retractable supporting pillar and a pivot provided on one end of the case body, the supporting pillar with one end being connected to the pivot and the blade set being connected to the other end of the supporting pillar so that after the cover is opened, the supporting pillar is rotated to stand up and then is extended for the blade set to receive wind.

2. The portable wind power generator according to claim 1, wherein the bottom of the case body is provided with a plurality of fixing frames to be fixed on a carrier provided on the top of a vehicle.

3. The portable wind power generator according to claim 1, wherein one end of the bottom of the case body is provided with a wheel assembly, and the other end of the top of the case body is provided with a telescopic pull rod.

4. The portable wind power generator according to claim 1, wherein the case body has a platen, one side of the platen is provided with two accommodating shells, and a gap is formed between of the accommodating shells.

5. The portable wind power generator according to claim 4, wherein the power-generating system further comprises an electricity unit and a storage unit received respectively in the accommodating shells.

6. The portable wind power generator according to claim 4, wherein the supporting pillar exactly received in the gap when it is folded.

7. The portable wind power generator according to claim 1, wherein one side of the case body is provided with a plurality of connectors electrically connected with the power-generating system.

8. The portable wind power generator according to claim 1, wherein the supporting pillar and the pivot are connected in a T-shaped manner.

9. The portable wind power generator according to claim 1, wherein the power-generating system further comprises a power-generating unit provided in the back of the blade set.

10. The portable wind power generator according to claim 1, wherein a distal end of the blade set is connected with a rudder.

11. The portable wind power generator according to claim 1, wherein the storage case is a wheeled luggage outlined case with a wheel assembly provided on one end of the bottom of the case body, and a telescopic pull rod provided on the other end of the top of the case body.

* * * * *